United States Patent [19]

Nanri et al.

[11] Patent Number: 4,996,560
[45] Date of Patent: Feb. 26, 1991

[54] APPARATUS FOR EXPOSING AN IMAGE OF AN ORIGINAL FILM ON A PHOTOSENSITIVE MATERIAL IN VACUUM CONTACT WITH THE ORIGINAL FILM, AND METHOD THEREFOR

[75] Inventors: Seiji Nanri; Masatoshi Ueno; Takashi Ohno, all of Hikone, Japan

[73] Assignee: Dainippon Screen Mfg. Co., Ltd., Japan

[21] Appl. No.: 429,813

[22] Filed: Oct. 31, 1989

[30] Foreign Application Priority Data

Oct. 31, 1988 [JP] Japan .................. 63-276568
Dec. 12, 1988 [JP] Japan .................. 63-160449
Jun. 29, 1989 [JP] Japan .................. 1-169263

[51] Int. Cl.$^5$ .................. G03B 27/20; G03B 27/02
[52] U.S. Cl. .................. 355/91; 355/132
[58] Field of Search .................. 355/91, 94, 132

[56] References Cited

U.S. PATENT DOCUMENTS

| | | | |
|---|---|---|---|
| 2,739,516 | 3/1956 | Hosterman | 355/94 |
| 4,029,404 | 6/1977 | Mizukami et al. | 355/91 |
| 4,316,669 | 2/1982 | Tachiki | 355/91 |
| 4,437,759 | 3/1984 | Mizukami et al. | 355/91 |
| 4,526,463 | 7/1985 | Hickey et al. | 355/91 X |
| 4,774,552 | 9/1988 | Nishihama et al. | 355/91 X |

FOREIGN PATENT DOCUMENTS

| | | |
|---|---|---|
| 56-5095 | 2/1981 | Japan . |
| 57-78526 | 5/1982 | Japan . |
| 58-118634 | 7/1983 | Japan . |
| 61-269136 | 11/1986 | Japan . |
| 1180413 | 2/1970 | United Kingdom . |

*Primary Examiner*—Richard A. Wintercorn
*Attorney, Agent, or Firm*—Ostrolenk, Faber, Gerb & Soffen

[57] ABSTRACT

An apparatus for exposing of an image of an original film on photosensitive material, the film and the photosensitive material being held together by vacuum contact between a transparent plate and a flexible sheet. The apparatus includes a squeegee unit which moves while pressing the flexible sheet. The squeegee unit forcibly moves the air, thereby speeding up the setting of the vacuum contact. The apparatus also includes a speed changing unit for changing the speed of the squeegee unit depending on the resistance of the air to movement. If the air moves easily, the squeegee unit moves rapidly. If the air does not move easily, the squeegee unit moves slowly, or the squeegee unit stops for a prescribed period and then, after the air is removed, is restarted. Thus, complete removal of air is carried out rapidly.

18 Claims, 12 Drawing Sheets

APPARATUS FOR EXPOSING AN IMAGE OF AN ORIGINAL FILM ON A PHOTOSENSITIVE MATERIAL IN VACUUM CONTACT WITH THE ORIGINAL FILM, AND METHOD THEREFOR

BACKGROUND OF THE INVENTION

1. Field of the Invention

The present invention relates to a graphic arts apparatus for forming an image of an original by exposure on photosensitive material (such as a photosensitive film or a presensitized plate) in vacuum contact with the original, and a method therefor. In particular, the present invention relates to techniques for improving vacuum contact between an original film and photosensitive material.

2. Description of the Related Art

A known vacuum contact printing apparatus consists of a transparent plate, an elastic sheet in vacuum contact with the transparent plate, a squeegee roller which rolls on the back surface of the elastic sheet, and a vacuum pump for removing the air between the transparent plate and the elastic sheet. The squeegee roller is used to expel air from between the transparent plate and the elastic sheet by pressing the elastic sheet The purpose of removing the air from between the transparent plate and the elastic sheet is to make reliable contact between the original film and the photosensitive material placed thereon. The reliable contact enables a pattern on the original film to be printed faithfully and clearly on the photosensitive material.

A vacuum contact printing apparatus of interest to the present invention is disclosed in Japanese Utility Model Publication No. 56-5095. This apparatus was proposed by the assignee company of the present application. Referring to FIGS. 1 to 3, the conventional vacuum contact printing apparatus comprises: a table 4 for printing, having a lower frame provided with an elastic rubber sheet 1 with an air outlet 9, and an airtight seal 2 formed to surround the rubber sheet 1; an upper frame 7 which is openable and closable with respect to the table 4, and having an edge frame 5 and a transparent plate 6 provided on the lower surface of the edge frame 5; a squeegee roller 11 for accelerating removal of the air from the space defined by the transparent plate 6, the rubber sheet 1 and the airtight seal 2; and a squeegee roller drive unit 40 for driving the squeegee roller 11. This apparatus further comprises evacuation means, not shown, for removing the air through the air outlet 9.

The original film and a photosensitive material are placed on the rubber sheet 1 and a transparent plate 6 is placed thereon. To prevent the rubber sheet 1 from being deformed downwardly by the weight of the original film or the photosensitive film, the apparatus further comprises a rubber sheet support unit 41 for supporting the rubber sheet 1 from below when the original film and the photosensitive material are placed on the rubber sheet 1.

The rubber sheet support unit 41 comprises: a vertically movable support plate 16 which contacts the lower surface of the rubber sheet 1 in its uppermost position; a pair of guide plates 48 fixed to the support plate 16 in juxtaposed relationship with each other in a direction perpendicular to the plane of the drawing to extend downward from both ends of the support plate 16, and having respective front end portions which bend obliquely downward; a contact member 49 provided on the lower end of each guide plate 48; and compression coil springs 51 provided between the lower surface of a base frame 26 and each contact member 49, for biasing the corresponding guide plate 48 upward.

In the central portion of each guide plate 48 is a guide groove 50. The grooves 50 are formed with a bend similar to the form of the guide plate 48. The rubber sheet support unit 41 further includes a contact member, not shown, for stably setting the support plate 16 in alignment with the upper surface of the base frame 26.

The squeegee roller drive unit 40 comprises: a pair of guide rails 14 provided on the right and left sides of a lower portion of the base frame 26 in juxtaposed relationship with each other and extending in the direction of the base frame 26; sliding tables 53 which slide along the guide rails 14; roller support arms 56 provided on the respective sliding tables 53, for rotatably supporting the squeegee roller 11; a guide roller 58 which is rotatably supported by intermediate portions of the roller support arms 56, with both of its ends inserted in the guide grooves 50, so as to be coupled to the guide plates 48; a pair of sprockets 54 provided near the ends of the base frame 26, under each guide rail 14; an endless chain 55 on each pair of sprockets 54; and a motor, not shown, for rotating the sprockets 54 in synchronization. The lower end of each sliding table 53 is coupled to the corresponding endless chain 55. A triangular guide member 59 is provided on the lower surface of the front edge 57 of the base frame 26.

In operation, the squeegee roller 11 is first located at the foremost position in the base frame 26. Since the guide roller 58 is in the front ends of the guide grooves 50, the guide plates 48 are pushed upward by the springs 51. The support plate 16 supports the rubber sheet 1 from below.

The operator opens the upper frame 7 and places an original film 31 and a photosensitive material 32 on the rubber sheet 1. After closing the upper frame 7, the operator presses a start button at an operation panel (not shown). The evacuating means, not shown, removes air through the air outlet 9 from a space 8 defined by the transparent plate 6, the table 4 and the airtight seal 2.

While air is being removed from the space 8, the motor rotates the sprockets 5. This causes the chains 55 to rotate to cause the upper portions thereof to move toward the rear side of the base frame 26. Since the lower ends of the sliding tables 53 are coupled to the corresponding endless chains 55, the sliding tables 53 move on the corresponding guide rails 14 toward the rear end of the base frame 26. As the guide roller 58 moves together with the sliding tables 53, the higher portions of the guide grooves 50 contact the guide roller 58. Since the vertical position of the guide roller 58 is fixed, the guide plates 48 are pushed downward by the guide roller 58 as the sliding tables 53 move to the rear. The support plate 16 is thus pulled down away from the lower surface of the rubber sheet 1.

The squeegee roller 11 travels while pressing against the lower surface of the rubber sheet 1. The squeegee roller 11 forces the air in the space 8 toward the air outlet 9 and the air is discharged through the air outlet 9. Thus, the blowhole often left between the original film 31 or the photosensitive material 32 and the rubber sheet 1 can be removed by the pressing force of the squeegee roller 11.

When the air is sufficiently removed, exposure is carried out. The squeegee roller 11 is then returned to the initial position according to procedures opposite to those before the exposure. In this case, however, the squeegee roller 11 does not necessarily need to press the lower surface of the rubber sheet 1. When the squeegee roller 11 is returned to the initial position, the guide plates 48 and the support plate 16 are pushed upward by the upward biasing force of the springs 51, to support the lower surface of the rubber sheet 1.

Another rubber sheet support unit 44 (FIG. 4) comprises: a rectangular support plate 60; vertical guide shafts 61 provided under the corners of the support plate 60; bearings 62 through which the corresponding guide shafts 61 are slidably engaged; a rod 64 which is rotatably coupled to a bearing 63; a crank 65 which is rotatably coupled to the rod 64; and a drive unit, not shown, for rotating the crank 65. The bearing 63 is located under the center of the support plate 60.

When the crank 65 is rotated by the drive unit, the rod 64 moves downward. Since the support plate 60 is coupled to the rod 64 through the bearing 63, it moves downward. The bearings 62 slidably support the guide shafts 61 so that the support plate 60 can be maintained in a horizontal position. When the crank 65 is rotated in the reverse direction by the drive unit, the support plate 60 can be raised while being maintained in a horizontal position.

In the above described conventional apparatus, the use of the squeegee roller 11 makes it possible to reduce the time required for achieving a vacuum contact. However, to further improve the function of such an apparatus, it is necessary to solve the following problems.

One of the problems is that the time required for completing vacuum contact in the conventional apparatus could be further reduced. Referring to FIG. 5A, at an initial stage, peripheral portions of the rubber sheet 1 contact the transparent plate before the central portion of the rubber sheet. This is because the air outlet 9 is provided in a peripheral portion of the rubber sheet 1 and the pressure in peripheral portions of the airtight space 8 is reduced first. The original film 31 and the photosensitive material 32 are normally placed in the central portion of the rubber sheet 1. Accordingly, a blowhole 33 is liable to be formed between the original film 31 and the photosensitive material 32. The squeegee roller 11 advances while pressing on the blowhole 33.

Referring to FIG. 5B, the squeegee roller 11, while travelling, squeezes the blowhole 33 toward the rear edge of the original film 31. However, as described above, vacuum contact has already been made around the original film 31 and the photosensitive material 32. Consequently, the air in the blowhole 33 cannot be easily moved to the peripheral portions. Nevertheless, the squeegee roller 11 continues to move.

FIG. 5C illustrates the partially dissolved blowhole 33 of the air which cannot follow the movement of the squeegee roller 11. The squeegee roller 11 moves over and past the blowhole 33 before the air in the blowhole 33 is completely moved.

Clear exposure cannot be carried out while the blowhole 33 shown in FIG. 5C exists. Therefore, it is necessary to continue the removal of the air. The squeegee roller 11 no longer serves to promote the removal of air. To sufficiently remove air, more time is required.

Another problem is that it is not so easy in the conventional apparatus to place the original film 31 and the photosensitive material 32 accurately on the rubber sheet 1.

In the apparatus shown in FIGS. 2 and 3, the support plate 16 is supported by the guide plates 48, which are forced upward by the springs 51. When the support plate 16 contacts the lower surface of the rubber sheet 1, the extent to which the springs 51 are compressed is relatively small. If force is applied to the rubber sheet 1 from above, it is transmitted to the springs 51 through the support plate 16 and the guide plates 48. The springs 51 are compressed with relative ease. As a result, the rubber sheet 1 can be moved vertically by a relatively small force. Consequently, it is difficult to place the original film 31 and the photosensitive material 30 on the rubber sheet 1 with stability.

High precision is required for positioning in an exposure process in contact printing. To accurately position the film 31 and the material 30, it is sometimes necessary to place one's hand on the rubber sheet 1. When the photosensitive material 30 is to be taped to the rubber sheet 1, or when the original film 31 is to be taped to the photosensitive material 30 after the material 30 is placed on the rubber sheet 1, it is necessary to apply prescribed pressure to the rubber sheet 1. Since the support plate 16 easily fluctuates vertically, it is not easy to carry out the above mentioned work.

The parts of the system shown in FIG. 4 must be manufactured and assembled with high precision. This increases the cost of manufacturing. Furthermore, the support plate 60 must be stiffer than necessary to support the rubber sheet 1, increasing the cost of manufacturing the entire apparatus. Moreover, the apparatus has the below described structural disadvantages.

Most of the load applied to the rubber sheet 1 is applied to the crank 65 through the support plate 60 and the rod 64. The support plate 60 is raised or lowered by rotating the crank 65. Since the operator may put his hand on the rubber sheet 1 as described above, the drive system must be very durable. The drive unit must also be capable of operating under a high load. These facts result in increased size, lack of durability and excess production costs.

SUMMARY OF THE INVENTION

An object of the present invention is to provide a vacuum contact printing apparatus which solves the above described problems, and in which air is rapidly removed.

The present invention is a vacuum contact printing apparatus which includes: a plate and a flexible sheet; evacuating means for evacuating air from between the plate and the flexible sheet; and air forcing means for forcing air toward an edge of a composite which is supported between the plate and the flexible sheet. The composite includes an original film and photosensitive material. The air forcing means includes (a) moving means for moving a squeegee in a first direction toward the edge of the composite while pressing the squeegee against the flexible sheet and (b) controlling means for controlling the moving means according to the position of the edge of the composite. The apparatus further includes means for printing an image of the original film on the photosensitive material by supplying light through the plate.

Since the apparatus according to the present invention includes the above described components, the air to be removed is pressed by the squeegee which moves at a speed according to the ease at which the air moves.

The squeegee does not move ahead of the air, and thus does not leave a blowhole behind it. Thus, there is no need for further removal of air. Thus, the present invention saves evacuation time after the operation of the squeegee, thereby reducing the time needed to operate the apparatus.

The foregoing and other objects, features and advantages of the present invention will become apparent from the following description of the invention with reference to the accompanying drawings.

DETAILED DESCRIPTION OF THE PREFERRED EMBODIMENTS

Figure 1:
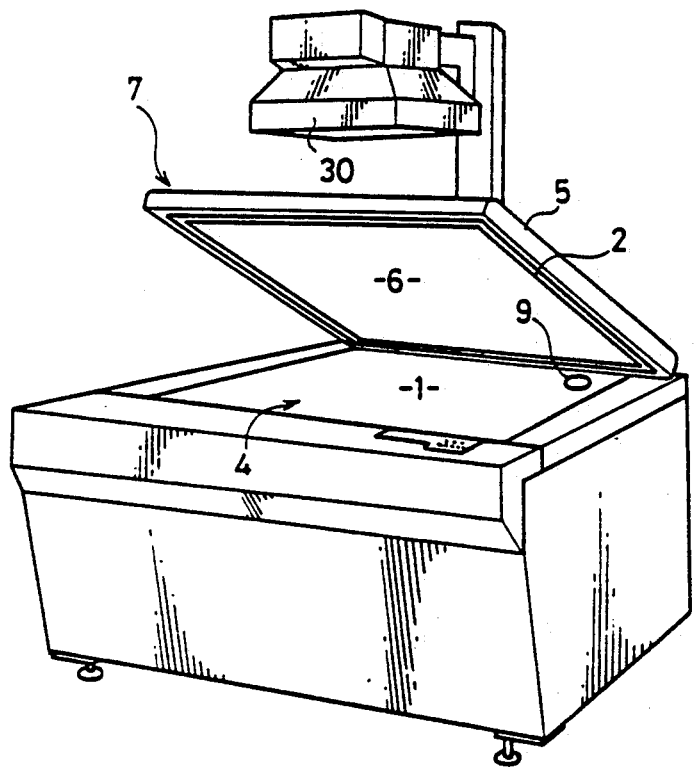
FIG. 1 is a perspective view of a vacuum contact printing apparatus.
Figure 2:
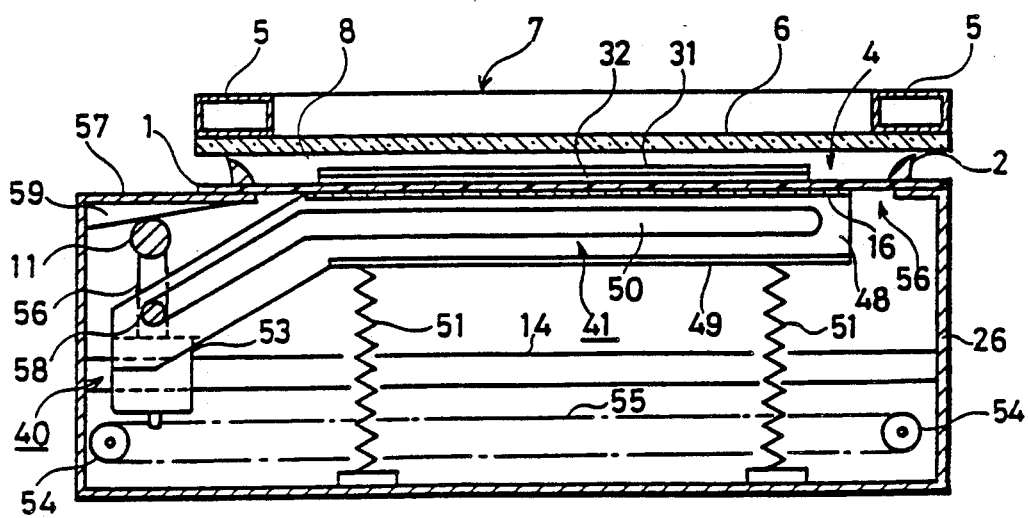
FIGS. 2 and 3 are sectional views of a conventional apparatus.
Figure 3:
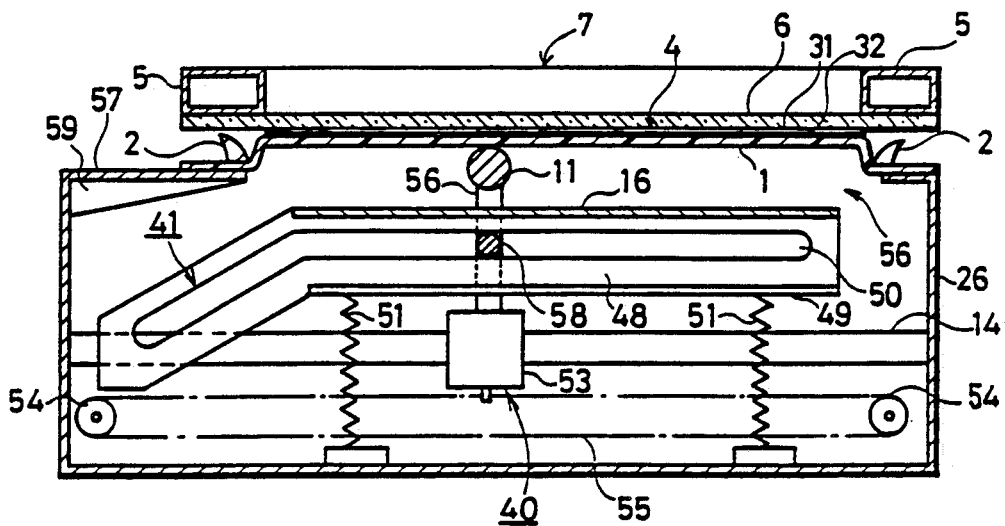
Figure 4:
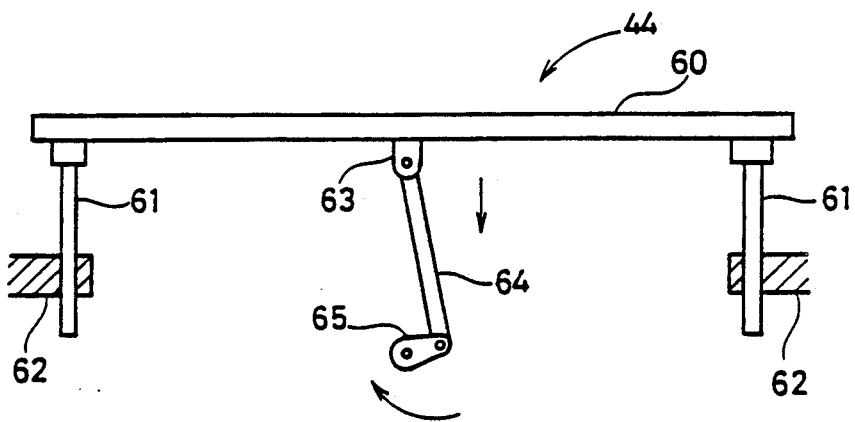
FIG. 4 is a schematic view of a main part of the conventional apparatus.
Figure 5A:
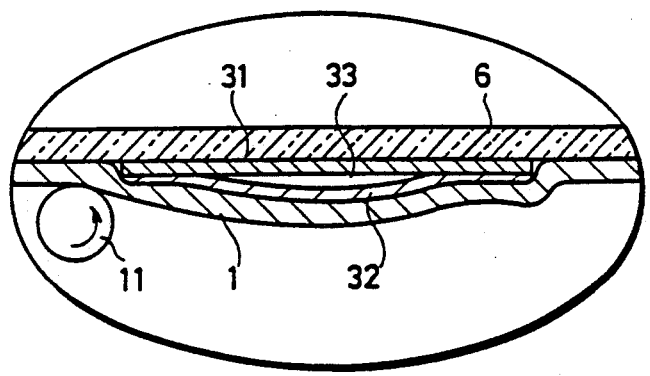
FIGS. 5A to 5C are sectional views of a main part of table.
Figure 5B:
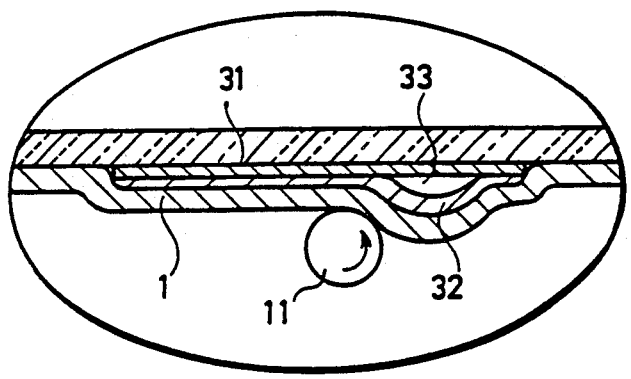
Figure 5C:
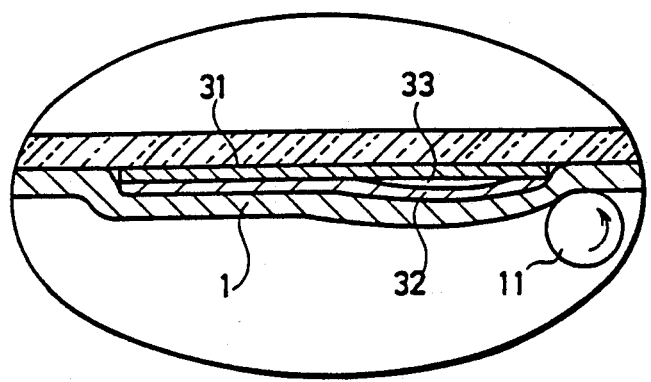

A vacuum contact printing apparatus according to the present invention is illustrated in FIGS. 6–9. The vacuum contact printing apparatus comprises: a base frame 26 having an upper frame 3 with openings 46 formed on its upper surface; a table 4 formed on the upper surface of the base frame 26, having an elastic rubber sheet 1 stretched over the openings 46, with an original film 31 and a photosensitive material 32 being placed thereon; a rotatable upper frame 7 provided on the upper surface of the base frame 26, for covering the table 4; a rubber sheet support unit 27 provided in the lower part of the inside of the base frame 26, for supporting the lower surface of the rubber sheet 1; a squeegee roller 11 which travels along the lower surface of the rubber sheet 1 while pressing the same; thereby speeding up vacuum contact; a squeegee roller drive unit 28 which supports the squeegee roller 11, pressing the lower surface of the rubber sheet 1, and which moves the squeegee roller 11 along the lower surface of the rubber sheet 1; an evacuating device 10 (such as a vacuum pump) for removing air from within the space defined by the upper frame 7 and the table 4; and a light source 30 provided above the upper frame 7.

Figure 6:
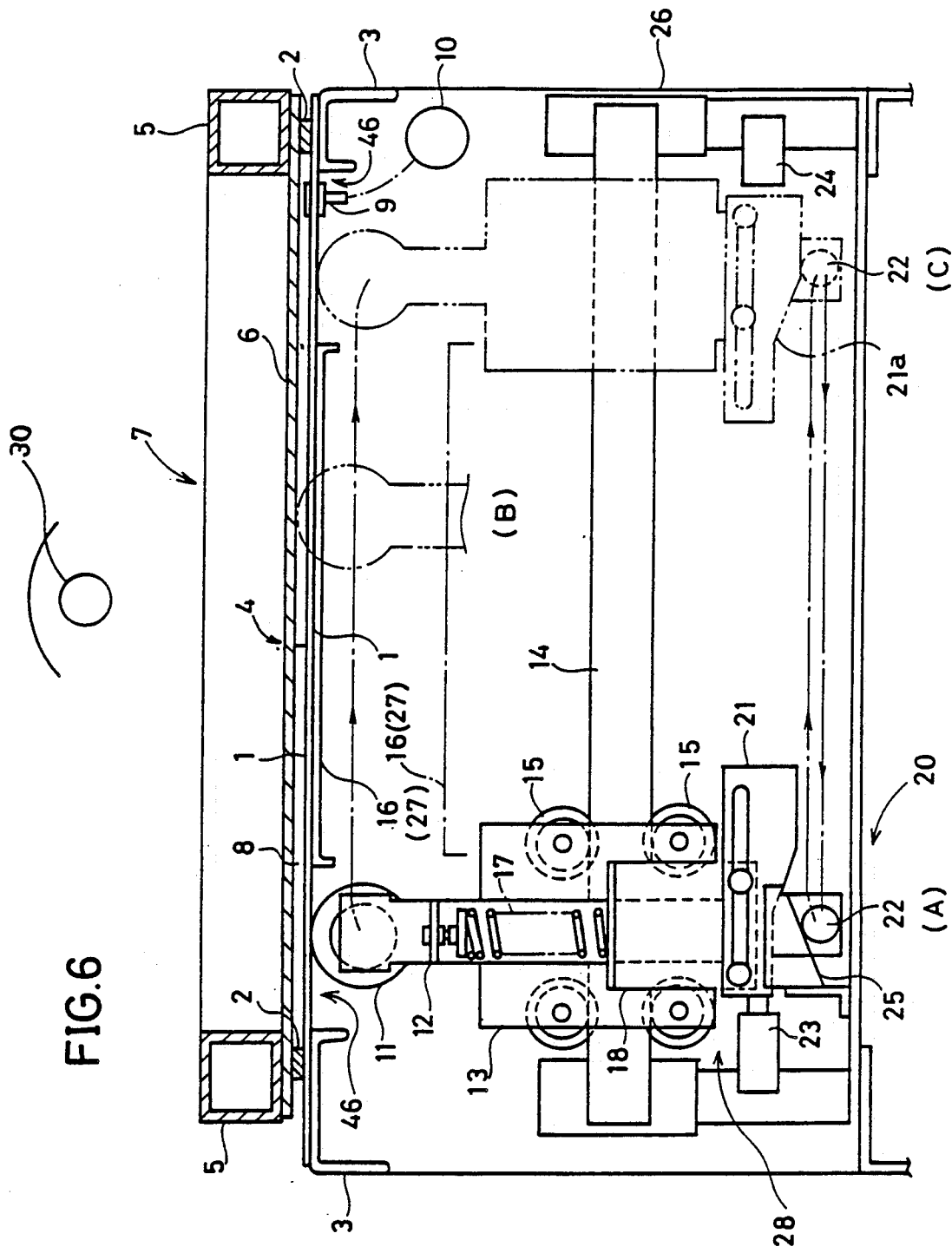
FIG. 6 is a side sectional view of an apparatus according to the present invention.

Only the upper end surface of the rubber sheet supporting unit 27 is shown in FIG. 6 for the sake of simplicity. The unit 27 is shown in detail in FIGS. 8 and 9.

The table 4 includes an airtight seal 2 formed on the upper surface of the rubber sheet 1. The airtight seal 2 surrounds the openings 46. The airtight seal 2 defines an airtight space between the upper frame 7 and the upper surface of the rubber sheet when the upper frame 7 is closed. An air outlet 9 is formed in at least one corner of the rubber sheet 1. The outlet 9 communicates with the evacuating device 10.

The upper frame 7 includes a transparent plate 6 covering the table 4 and an edge frame 5 for holding the periphery of the transparent plate 6. The edge frame 5 exists only in the peripheral portions of the transparent plate 6 and it does not interrupt the light projected by the light source 30, which reaches the transparent plate 6.

The rubber sheet support unit 27 includes a support plate 16 for supporting a prescribed region at the center of the lower surface of the rubber sheet 1, a support mechanism 90 for supporting the support plate 16 in a vertically movable manner, and a support plate drive unit 91 for driving the support mechanism 90 to raise or lower the support plate 16.

The support mechanism 90 includes: a pair of right and left bearings 71 provided on the lower surfaces of both sides of the front edge portion (on the left lower side in FIG. 8) of the support plate 16; a pair of right and left first arms 72 having respective front ends fitted to the right and left bearings 71; a coupling shaft 73 for coupling the rear ends of the first arms 72 in the transverse direction; a pair of right and left bearings 74 provided on the base frame 26 in the portions under the bearings 71; and a pair of right and left second arms 75. The arms 75 are as long as the first arms 72. The arms 75 are linked together at their middle points 70 to the middle points of the first arms 72 to form X-shaped links. The support mechanism further includes a pair of guide rollers 76 supported in the rear end portions of the second arms 75; and a pair of guide rails 77 provided on the lower surfaces of both sides of the rear edge portion of the support plate 16, for guiding the corresponding guide rollers 76 and for regulating the separation thereof from the support plate 16.

The support plate drive unit 91 includes a pair of right and left nuts 78 which move in the back-and-forth direction, each nut 78 having a fork portion 79 which is engaged with the coupling shaft 73. The nuts 78 are screwed onto a pair of right and left screw shafts 80. The support plate drive unit further includes sprockets 81 provided on the rear end of the respective screw shafts 80; and an endless chain 82 on the sprockets 81. Thus, the chain 82 is rotated in synchronization with the right and left screw shafts 80. The support plate drive unit further includes a motor M3 for rotating the screw shafts 80, to thereby move the coupling shaft 73 in the back-and-forth direction. The motor M3 is coupled to one of the screw shafts 80 through a speed reducer 83. The support plate drive unit further includes a spring 85 provided between a middle portion of the coupling shaft 73 and a suitable portion in the frame, for biasing the coupling shaft 73 forward to support the weight of the support plate 16. The height of the coupling shaft 73 is maintained at the same level as that of the bearings 74.

The squeegee roller drive unit 28 includes: a pair of right and left supports 12 for rotatably supporting the squeegee roller 11 at both ends thereof; running saddles 13 for supporting the respective supports 12 in a vertically movable manner; a pair of right and left guide rails 14 along which the running saddles 13 move; and a roller elevating mechanism 20 for pressing and spacing the squeegee roller 11 against and from the rubber sheet 1 by raising and lowering the supports 12.

The running saddles 13 include: a guide roller 15 which rolls along the guide rails 14; and a roller support plate 18 which is fixed to the running saddles 13, for supporting the squeegee roller 11, and for pressing the same against the lower surface of the rubber sheet 1 through a spring 17.

The roller elevating mechanism 20 includes: plate cams 21 which are movable with respect to the roller support plate 18; cam followers 22 on the lower ends of the supports 12 and engaging with the cam surfaces 21a of the respective plate cams 21; a start point contact portion 23 in a start position A of the squeegee roller 11 (shown by solid lines in FIG. 6), for moving the plate cams 21 to the pressing side; an end point contact portion 24 in a movement end position C of the squeegee roller 11 (shown by chain lines in FIG. 6), for moving the plate cams 21 to the pressing release side; and start point cam plates 25 for maintaining the release of the pressure to which the cam followers 22 are removed from the cam plates 21 at the return to the start position A.

Figure 7:
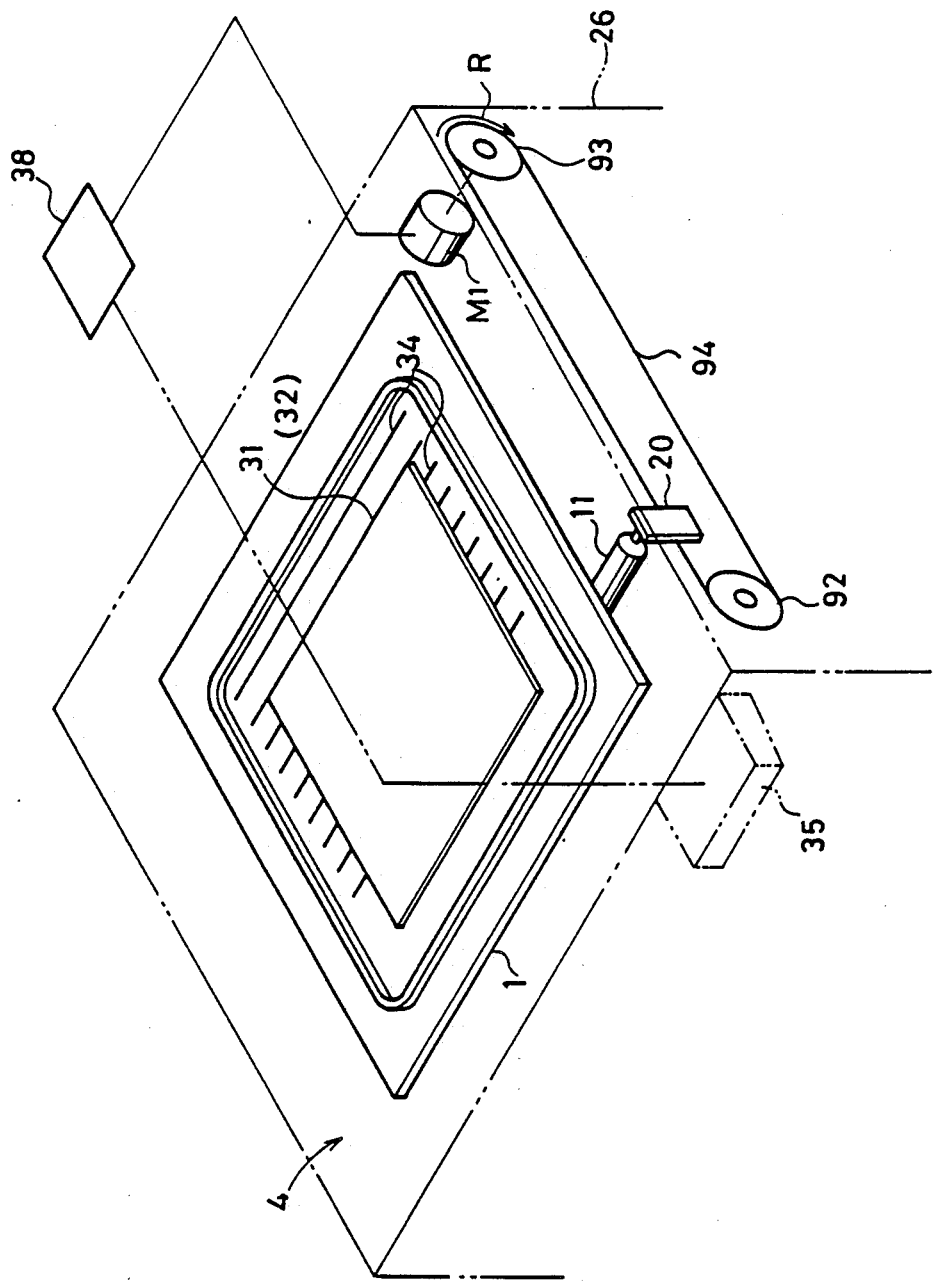
FIG. 7 is a schematic perspective view of the apparatus according to the present invention.
Figure 8:
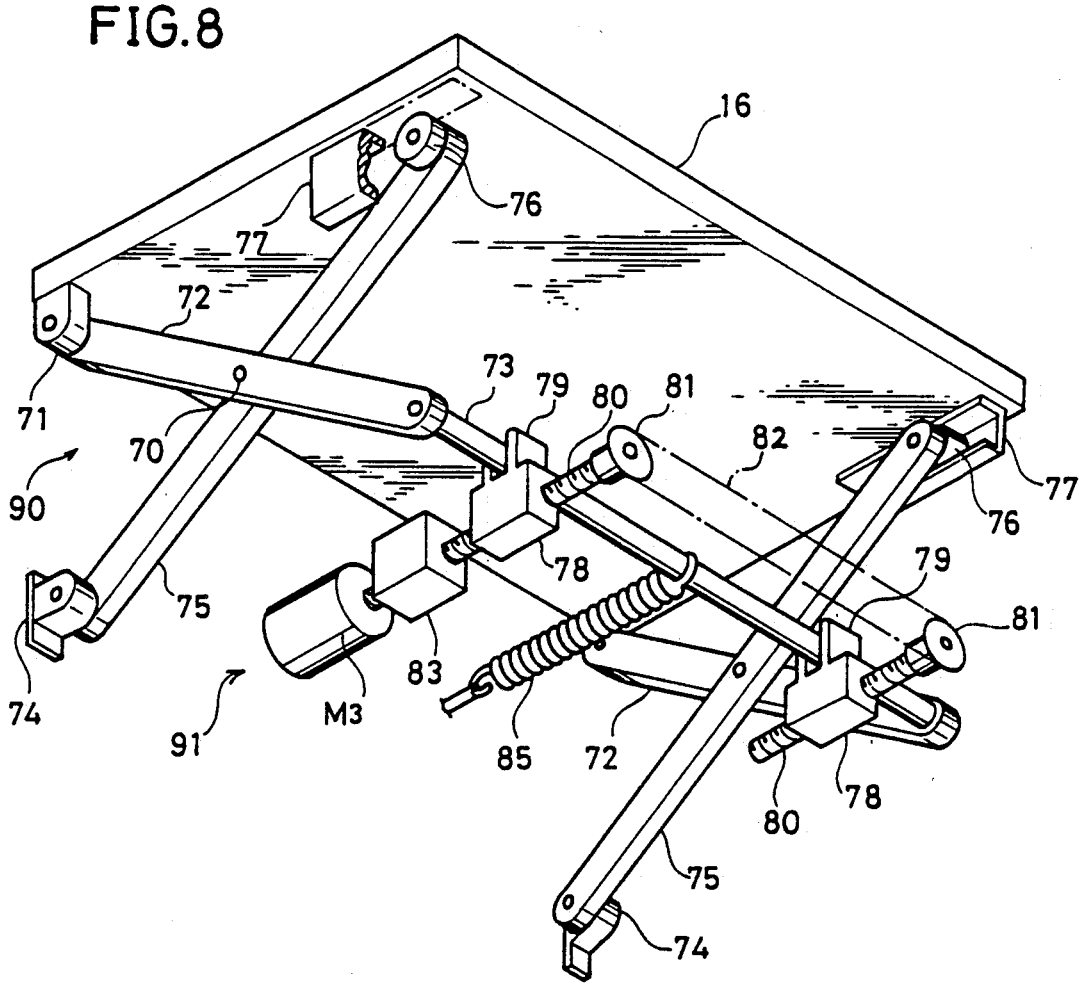
FIG. 8 is a perspective view of a rubber sheet support unit.
Figure 9:
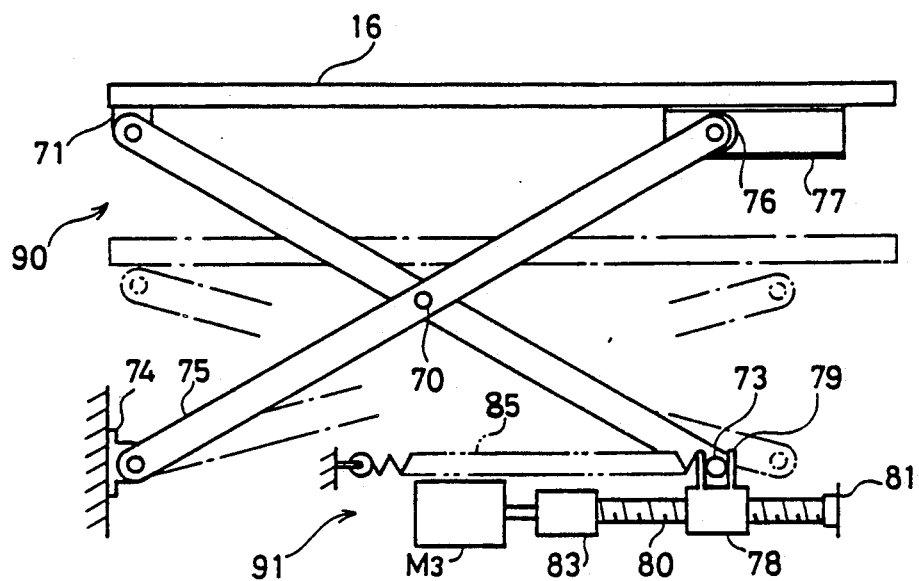
FIG. 9 is a side view of the rubber sheet support unit.

Referring to FIG. 7, the squeegee roller drive unit 28 further includes: two pairs of sprockets 92, 93 provided near the ends of the inner lower portion of the base frame 26; two endless chains 94 on the pairs of sprockets 92, 93; a motor M1 for rotating the sprockets 93 in synchronization; and a motor control circuit 38 for controlling the motor M1. The lower ends of the roller elevating mechanism 20 are coupled to the corresponding endless chains 94.

The vacuum contact printing apparatus further comprises an operation panel 35 provided on a front end upper portion of the base frame 26. Graduations 34 for reading the rear edge position of the original film and the like are provided on the upper surface of the rubber sheet 1. The operation panel 35 is connected to the motor control circuit 38 and provides a value corresponding to the graduation indicating the rear edge of the original film, etc., to the circuit 38. The circuit 38 defines the operation of the squeegee roller 11 based on the inputted value. Thus, the changing condition of the moving speed of the squeegee roller 11 is preset by the circuit 38. Since it is not necessary to strictly control the speed of the squeegee roller 11, the graduations 34 may be formed with rough pitches. The graduations 34 do not need to be formed on the rubber sheet 1. For example, the graduations 34 may be formed in a suitable position on the table 4.

In operation, the original film 31 and the photosensitive material 32 are overlapped and placed on the table 4. After the upper frame 7 is closed, a start button (not shown) on the operation panel 35 is pressed, whereby the vacuum contact printing apparatus starts operation. The evacuating device 10 removes air from within the space 8. The rubber sheet 1 first contacts the transparent plate 6 at its peripheral portions. This is because the air is exhausted from the peripheral portions of the space 8.

When the original film 31 and the photosensitive material 32 are to be placed on the rubber sheet 1, the nuts 78 are first located in the foremost positions of the screw shafts 80 by means of the motor M3. Since the coupling shaft 73 engages with the nuts 78, the rear ends of the first arms 72 are near the front ends of the second arms 75. Accordingly, the X-shaped links formed by the arms 72 and 75 are vertically stretched such that the upper surface of the support plate 16 contacts and supports the lower surface of the rubber sheet 1 (as shown by the solid lines in FIG. 6).

The nuts 78 prevent downward movement of the support plate 16. Further, the components are not subjected to particularly large loads. Thus, the components can be easily manufactured and assembled. Accordingly, the film 31 and the material 30 can be conveniently placed on the rubber sheet 1 and the work can be carried out rapidly and accurately.

Simultaneously with the start of the printing apparatus, the shaft of the motor M3 rotates. This causes the nuts 78 to move away from the motor M3 toward the sprockets 81. Since the rotation of the motor M3 is transmitted simultaneously to the two screw shafts 80 by the endless chain 82, the nuts 88 move horizontally in the same direction at the same speed.

The coupling shaft 73, which is supported by the fork portions 79 of the nuts 78, moves horizontally back-and-forth. The X-shaped links formed by the first and second arms 72 and 75 constitute a parallel movement mechanism. The front ends of the first arms 72 and the rear ends of the second arms 75 are always maintained at the same level. Accordingly, the height of the axis of the bearing 71 engaged with each first arm 72 is equal to the distance of the axis of the guide roller 76 of each second arm 75 from the lower surface of the support plate 16. Thus, the horizontal position of the support plate 16 is maintained as the plate 16 is raised and lowered.

Since the engaging portion at the front end of each second arm 75 is provided just below the engaging portion at the front end of the corresponding first arm 72, the support plate 16 remains horizontal as it is raised and lowered.

When the support plate 16 is lowered to the position shown by chain lines in FIG. 6 to allow for movement of the squeegee roller 11, the motor control circuit 38 operates the motor M1 to rotate the sprockets 93 in the direction shown by the arrow R in FIG. 7. The sprockets 92 and the endless chains 94 are rotated as the sprockets 93 rotate. The running saddles 13 start to move toward the rear end of the base frame 26 at a predetermined speed, e.g., 200 mm/sec.

When the squeegee roller 11 is in the start position A, the cam followers 22 are moved downward and the squeegee roller 11 is separated from the lower surface of the rubber sheet 1 by the start point cam plates 25. When the running saddles 13 move, the cam followers 22 are separated from the start point cam plates 25 and the squeegee roller 11 is pressed against the lower surface of the rubber sheet 1 by the compression spring 17. As the motor M1 continues to operate, the squeegee roller 11 moves to the point B and then to the end position C In the end position C, the plate cam 21 is caused to slide by the end point contact portion 24 and each cam follower 22 is moved downward by the lower end 21a of the plate cam 21. Thus, the squeegee roller 11 is separated from the lower surface of the rubber sheet 1.

The apparatus of this embodiment is considerably different from the conventional apparatus in that the squeegee roller 11 is stopped for a predetermined period (e.g., 3 sec.) in an intermediate position (shown by the point B). The movement of the roller 11 is a function of the operation of the motor M1 and the operation of the motor M1 is controlled by the motor control circuit 38. The point B is a little short, e.g., about 50 mm short, of the rear edge of the original film 31 and the photosensitive material 32. The squeegee roller 11 moves beyond the point B at a reduced speed, e.g., about 15 mm/sec.

Alternatively, the squeegee roller 11 is not stopped but proceeds at a considerably slower speed before it reaches the point B.

Alternatively, after temporarily stopping at the point B, and after an elapse of time required for the air to the rear of the point B to be removed, the squeegee roller 11 may move again at a speed of about 200 mm/sec.

The peripheral portions of the rubber sheet 1 have already made close contact with the transparent plate 6. In operation, the forced movement of the blowhole 33 toward the outlet side by the squeegee roller 11 is suppressed because of the contact between the peripheral portions of the sheet 1 and the plate 6. The conventional apparatus disregards this fact and accordingly cannot remove air rapidly. With the present invention, by controlling the movement of the squeegee roller 11, the air in the blowhole 33 is continuously pushed to the air outlet 9. Consequently, removal of air is speeded up.

In the first embodiment, the original film 31 and the photosensitive material 32 (of a finish size corresponding to the A0 size (1420 mm × 1140 mm), for example) can be brought into close contact with each other for about 40 sec. The conventional apparatus requires about 60 sec. Thus, the present invention reduces the period required for contact by about 20 sec.

The squeegee roller may be stopped at an intermediate point or the speed of the roller may be decreased considerably without stopping the roller. When the roller is stopped at an intermediate point, the remaining distance is preferably traversed after the original film and the photosensitive material are completely in contact, after the blowhole is essentially eliminated.

In the first embodiment, desired contact can be obtained when the advancing movement of the squeegee roller 11 is terminated. With the contact of the original film 31 and the photosensitive material 32 being maintained, the light source 30 turns on to start printing.

When the printing is terminated, the motor M1 rotates the sprockets 92, 93 and the endless chains 94 in the reverse direction. The squeegee roller 11 is separated from the lower surface of the rubber sheet 1 as the squeegee roller 11 returns to the start position A. In the start position A, the plate cams 21 are moved rearwardly by the contact portion 23. Further, the cam followers 22 are pushed under the corresponding cam plates 25 such that the squeegee roller 11 remains separated from the lower surface of the rubber sheet 1.

The motor M3 causes the screw shafts 80 to rotate in the reverse direction. Both of the screw shafts 80 rotate simultaneously in the same direction by means of the sprockets 81 and the endless chain 82. The nuts 78 move simultaneously toward the motor M3 as the screw shafts 80 rotate. The coupling shaft 73 engaging with the upper surfaces of the nuts 78 also moves toward the motor M3. The ends of the first arms 72 approach the bearings 74, whereby the X-shaped links are vertically stretched. The support plate 16 is raised to hold the lower surface of the rubber sheet 1. In this case, since the coupling shaft 73 moves on a horizontal plane while being maintained horizontal, the upper surface of the support plate 16 is always maintained in a horizontal position.

After exposure, the vacuum contact by the evacuating device 10 is cancelled. The operator opens the upper frame 7 and takes out the original film 31 and the photosensitive material 32. This can be done smoothly since the lower surface of the rubber sheet 1 is firmly supported by the support plate 16.

Figure 10:
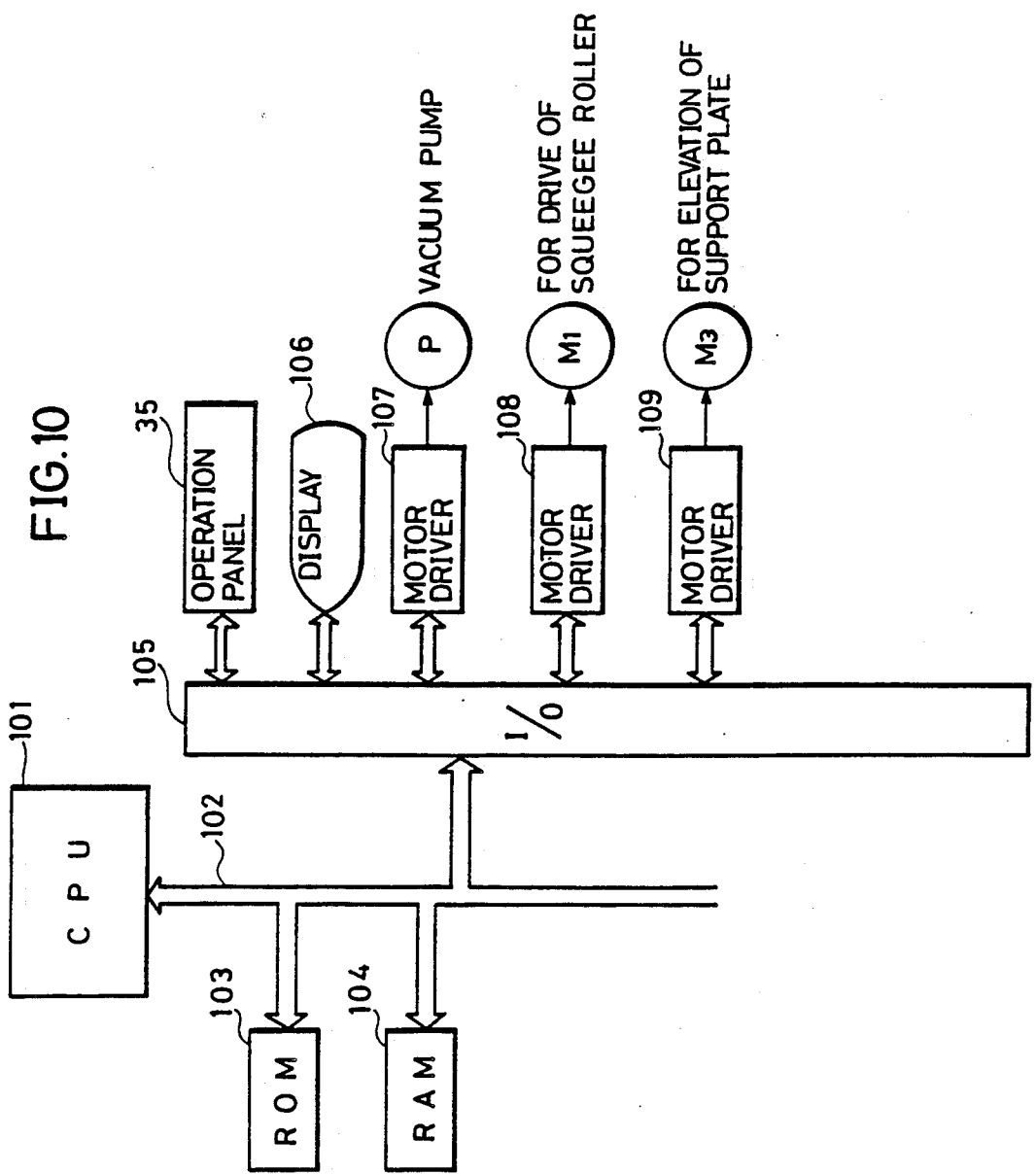
FIG. 10 is a block diagram of a vacuum contact printing apparatus.

Referring to FIG. 10, the motor drive circuit 38 includes: a CPU (Central Processing Unit) 101, a bus 102 connected to the CPU 101, a ROM (Read Only Memory) 103, connected to the bus 102, where programs for controlling the operation of the vacuum contact apparatus are stored, a RAM (Random Access Memory) 104 connected to the bus 102, and used as a working-storage area by the CPU 101, and an I/O interface 105 connected to the bus 102. The ROM 103 stores a table correlating the graduations 34 to the input values.

The interface 105 includes an operation panel 35, a display 106 provided on the operation panel 35, for displaying the conditions of operation and the like, a motor driver 107 for driving a vacuum pump P, and motor drivers 108, 109 for driving the motors M1, M3, respectively.

Figure 11:
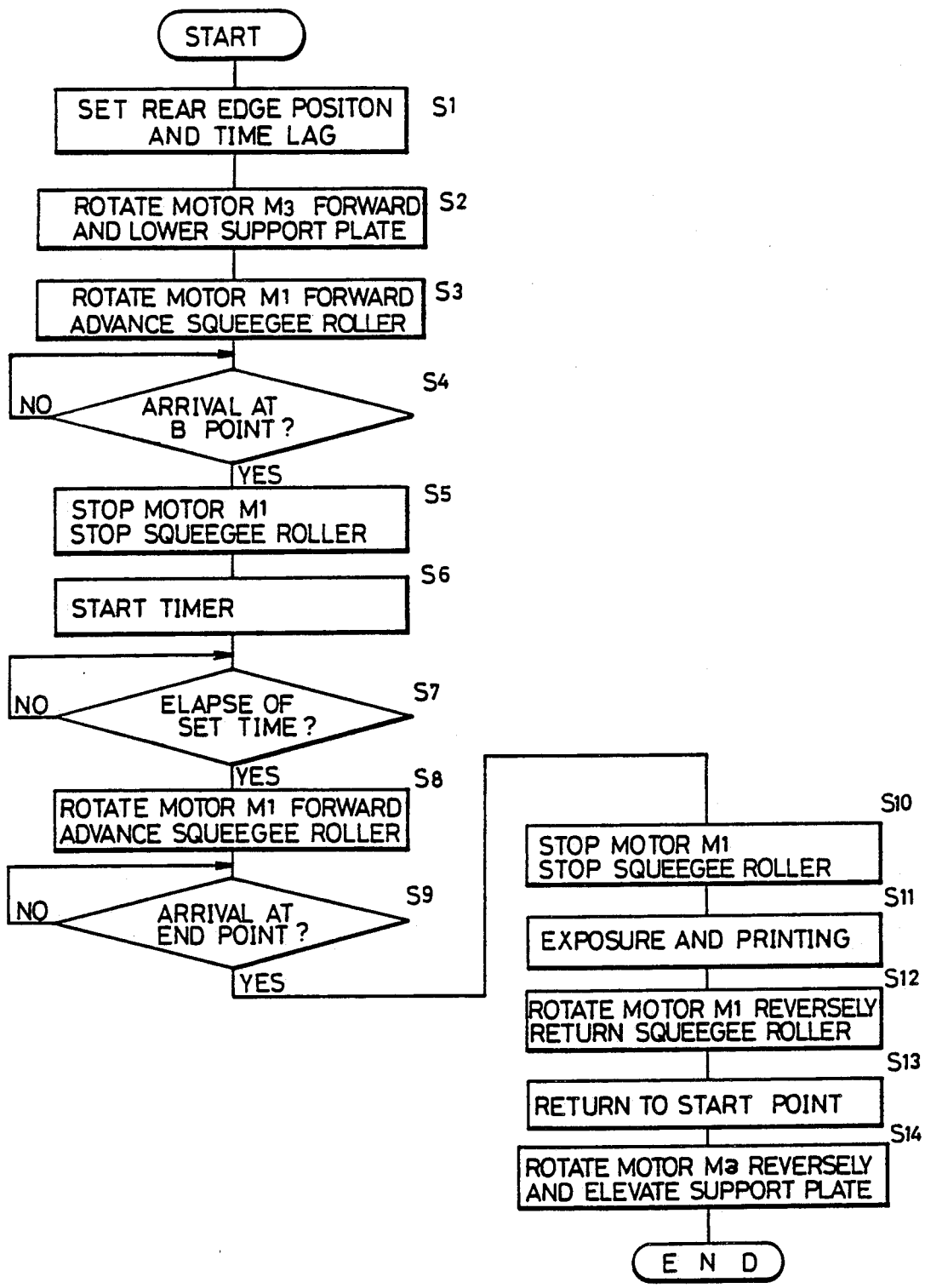
FIG. 11 is a flow chart of a program for controlling the vacuum contact printing apparatus.
Figure 12:
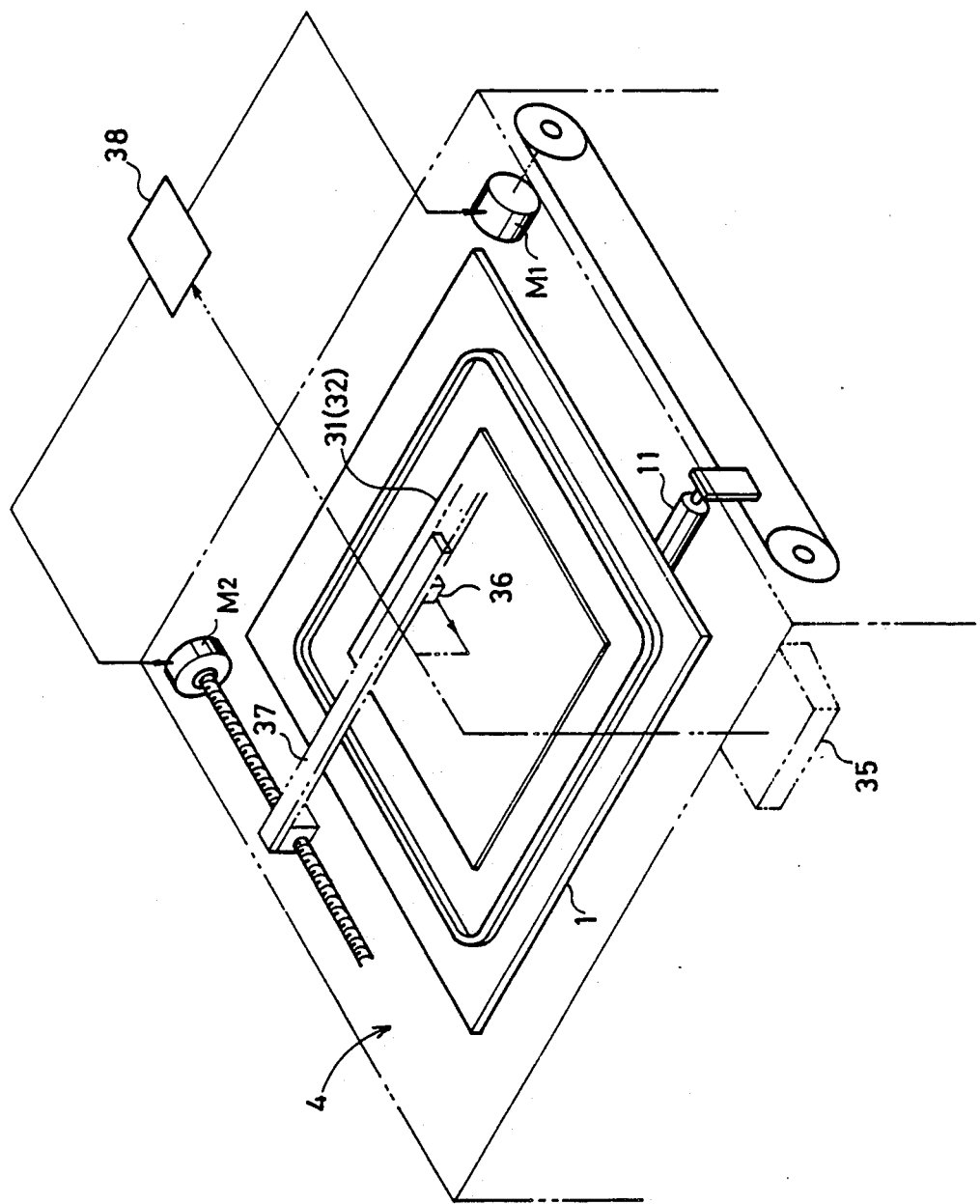
FIG. 12 is a schematic perspective view showing a vacuum contact printing apparatus according to the present invention.
Figure 13:
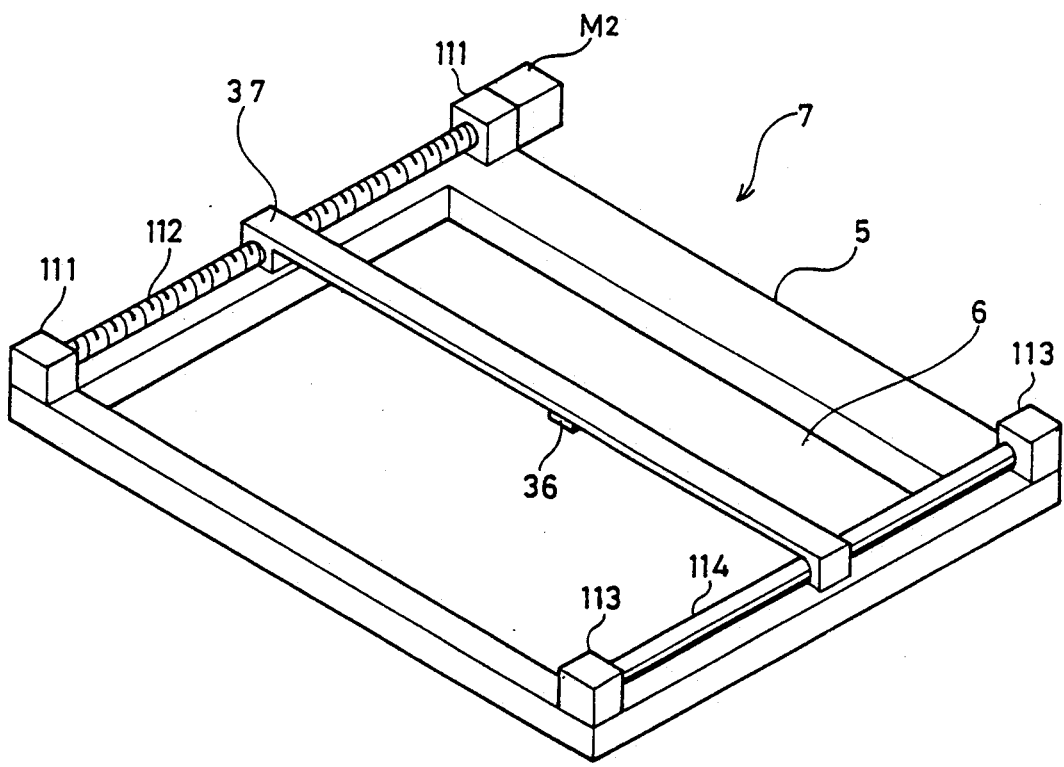
FIG. 13 is a perspective view of an upper frame of the apparatus.

The control of a main part of a program executed by the CPU 101 is illustrated in FIG. 11. In step S1, a rear edge position of the original film 31 and an intermediate stop time of the squeegee roller 11 are set by the operator through the operation panel 35. The original film 31 and the like have already been placed on the rubber sheet 1 and the vacuum pump 1 has started operation.

In step S2, the motor M3 is rotated in one direction by the motor driver 109 and the support plate 16 is lowered The step S3, the motor M1 is rotated in one direction and the squeegee roller 11 moves at a predetermined speed. The position of the squeegee roller 11 may be detected by counting the number of pulses of the motor driver 109.

In step S4, a determination is made as to whether the squeegee roller 11 has reached the stop point B. If the condition is met, the motor M1 is stopped and the squeegee roller 11 is also stopped.

The steps S6 and S7 are waiting steps wherein the squeegee roller 11 is stopped for the stop time set in step S1. In step S6, a timer is started. In step S7, the set stop time and the count of the timer are compared. If the count of the timer is larger than the set stop time, the flow proceeds to step S8.

In step S8, the motor M1 is restarted to rotate again in the one direction and the squeegee roller 11 moves in the same direction as before, but at a very low speed. In step S9 a determination is made as to whether the squeegee roller 11 has reached the end point C.

If the roller 11 has reached the end point C, the motor M1 is stopped again (step S10) and the squeegee roller 11 is stopped at the end position C. Then, in step S11, printing and exposure by using the light source 30 are carried out.

In step S12, the rotating shaft of the motor M1 is rotated in the reverse direction and the squeegee roller 11 moves to the start position. During step S13, the squeegee roller 11 returns to the start point and the motor M1 is shaped.

In step S14, the motor M3 rotates in the reverse direction and the support plate 16 is raised The motor M3 is stopped when the support plate 16 reaches a predetermined level. After that, operation of the evacuating device 10 is discontinued and the original film and the photosensitive material are removed from the apparatus.

A vacuum contact printing apparatus according to a second embodiment of the invention is illustrated in FIGS. 12–15. The second embodiment has a sensor 36 for detecting the rear edge positions of the original film 31 and the photosensitive material 32, and a mechanism for driving the sensor 36. The sensor 36 and the driving mechanism are provided in place of the graduations 34 of the first embodiment. The embodiments are otherwise the same. The same components as those of the first embodiment, including components not referred to in the following description, are assigned the same reference characters and the same names.

The upper frame 7 of the second embodiment includes: a pair of opposed bearings 111; a pair of opposed support members 113; a screw shaft 112 with ends which are supported by the bearings 111; a shaft 114 with ends which are supported by the support members 113; a motor M2 fixed to one of the bearings 111, for rotating the screw shaft 112 around its axis; a running beam 37 having one end engaged with the screw shaft 112 and the other end slidably supported by the shaft 114; and a sensor 36 provided under a central portion of the running beam 37.

The motor M2 is connected to the interface 105 through the motor driver 110. The sensor 36 is also connected to the interface 105. The sensor 36 is a reflection type photosensor, e.g., a CCD (Charge Coupled Device) using light of a certain wavelength so as not to exert any adverse effect on the photosensitive material 32. The second embodiment is characterized in that the sensor 36 automatically reads the rear edge position of the original film 31 in place of visual confirmation of that position by the operator.

Figure 14:
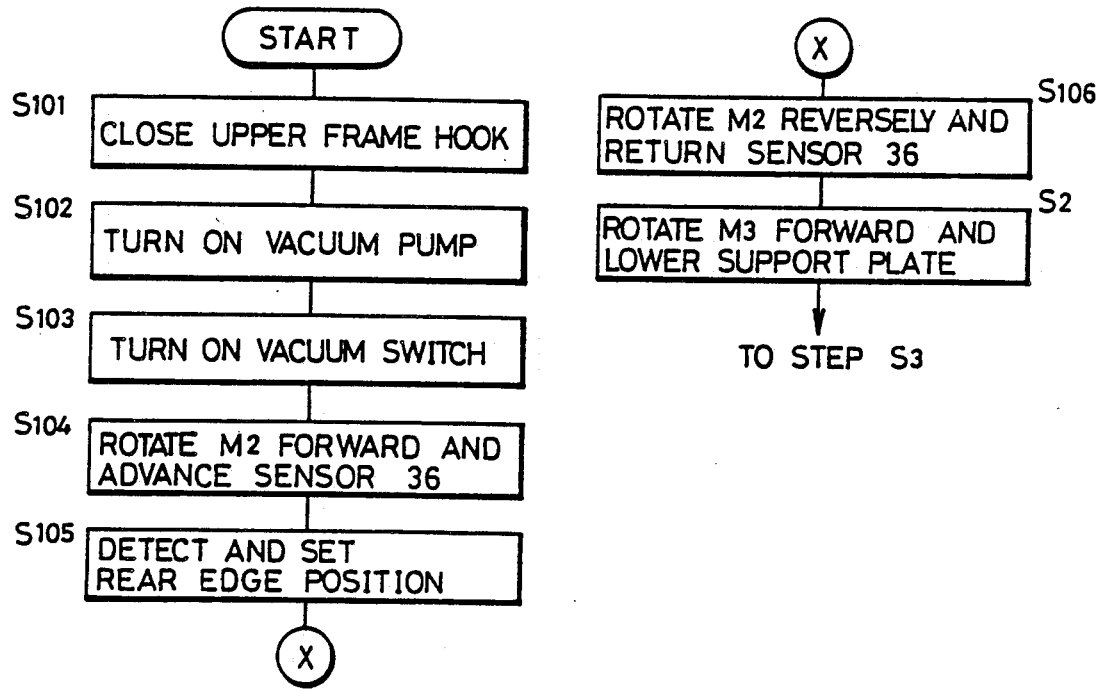
FIG. 14 is a flow chart of a main part of a program for controlling the vacuum contact printing apparatus.
Figure 15:
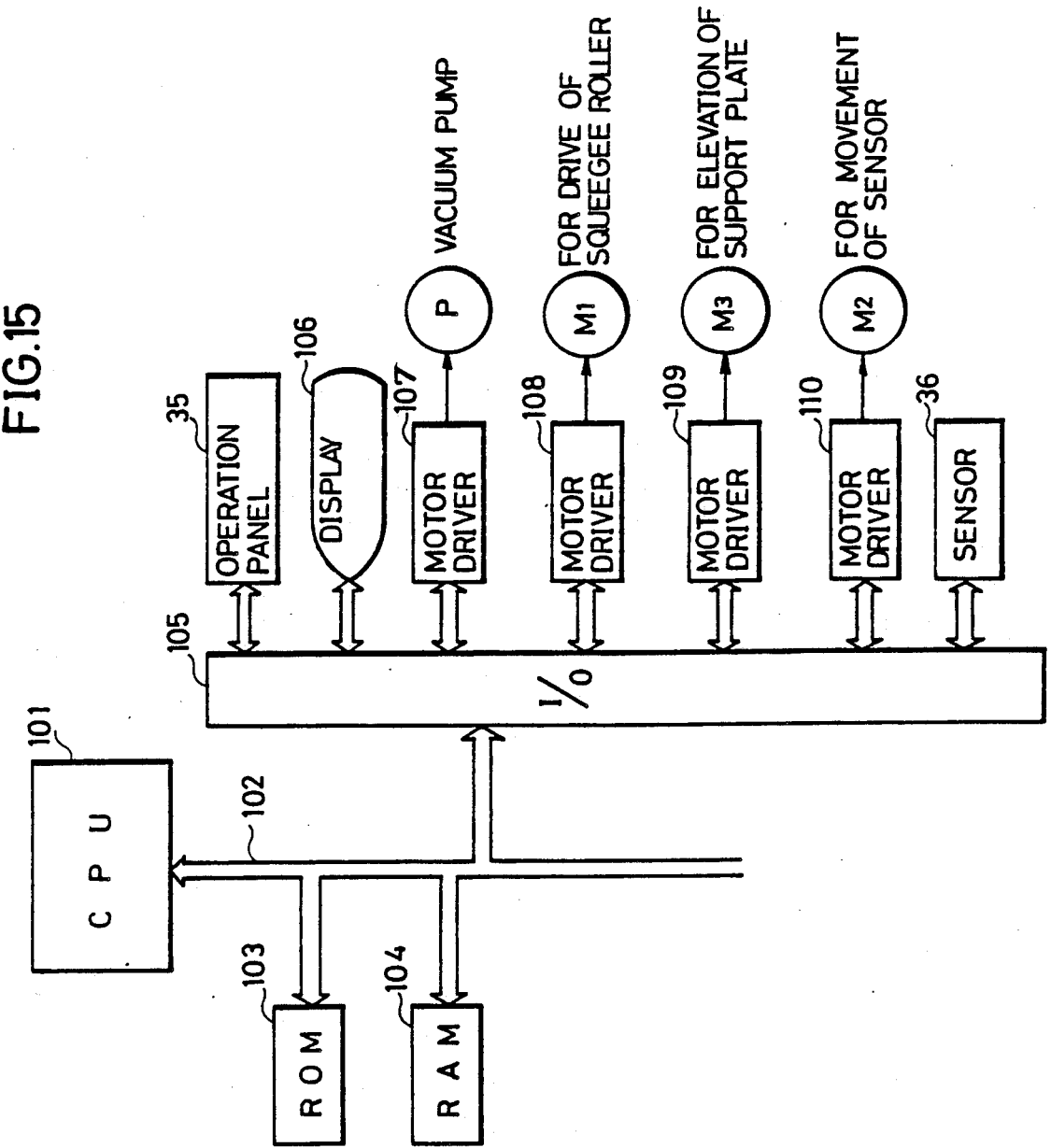
FIG. 15 is a block diagram of the vacuum contact printing apparatus.

The flow chart of FIG. 11 and that of the second embodiment are the same starting from step S2. FIG. 14 shows only the processing from the start of the vacuum contact printing apparatus till the step S2.

In step S101, the operator places the original film 31 and the photosensitive material 32 on the rubber sheet 1 and closes the upper frame 7. When a hook, not shown, provided in the upper frame 7 is closed, operation of the vacuum pump P is started in step S102. A vacuum switch, not shown, is turned on in step S103 in response to a partial vacuum, which is detected by the CPU 101.

In step S104, the motor M2 is rotated in the regular direction, so that the running beam 37 moves on the transparent plate in one direction. In step S105, the rear edge position of the original film 31 is detected by the CPU 101 by an output change of the sensor 36. The detected result is stored in the RAM 104.

In step S106, the motor M2 rotates in the reverse direction, so that the running beam 37 returns to the initial position. Further, in steps S2 et seq., the program for controlling the apparatus of the first embodiment is executed. Since the description thereof is already given, it is not repeated.

In the second embodiment also, the squeegee roller 11 stops at a position set by the sensor 36 (a little short of the rear edge of the original film 31 and so on) or the speed of the squeegee roller 11 is lowered considerably at that position. In consequence, the air remaining near the original film 31 can be completely removed and printing can be carried out in good condition. In the second embodiment, the rear edge position is automatically set. Thus, operation of the apparatus is very simple.

The present invention is not limited to the specific embodiments described above. For example, the advantages of the present invention can be obtained by using a light source which is provided under the transparent plate as described below in connection with FIGS. 16–18.

In the third embodiment, a light source 202 is disposed on a lower portion of a base frame 201 and under a transparent plate 203 An original film 205 and then a photosensitive material 206 are placed on the plate 203. Reference numeral 209 denotes a vacuum pump; 215 a roller for winding up an elastic rubber sheet 204; 218 an airtight seal; and 220 a register pin for positioning the original film 205 and the photosensitive material 206 on the transparent plate 203.

Figure 16:
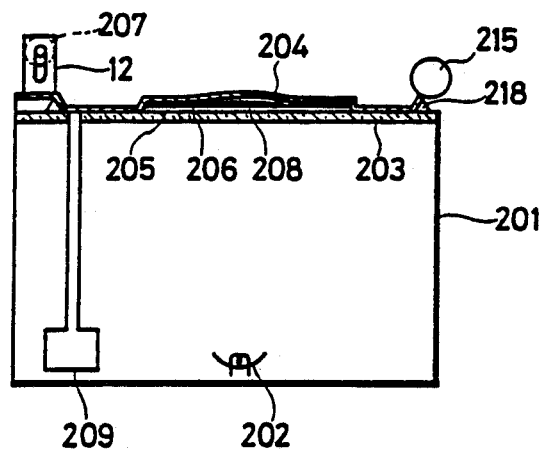
FIGS. 16 through 18 are schematic sectional views illustrating another embodiment of the invention.
Figure 17:
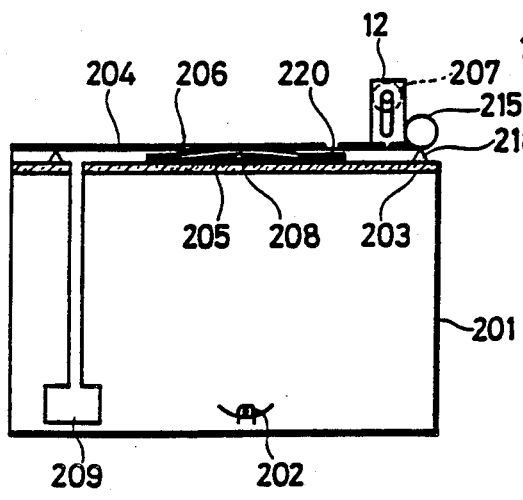
Figure 18:
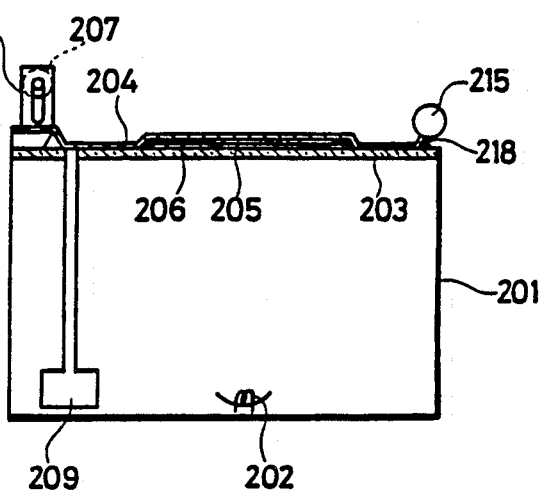

In operation, the original film 205 and the photosensitive material 206 are placed on the transparent plate 203. The roller 215 is then moved horizontally by a driving unit (not shown) and rotated along and over the transparent plate 203 and the photosensitive material 206 so as to draw up and stretch the rubber sheet 204 over the same. The vacuum pump 209 is actuated to remove the air from within the space defined by the transparent plate 203, the rubber sheet 204, and the airtight seal 218, as shown in FIG. 16. Next, the squeegee roller 207 is moved horizontally toward the roller 215 from left to right as viewed in FIG. 17 by the unit 28 without contacting the rubber sheet 204 The squeegee roller 207 is then returned to its initial position while pressing the upper surface of the rubber sheet 204 as shown in FIG. 18 to bring the original film and the photosensitive material into close contact with each other. The third embodiment is otherwise the same as the first embodiment. For example, the squeegee roller 207 is stopped or moved at a reduced speed at an intermediate point so as to rapidly and completely expel a blowhole 208, as in the first embodiment.

Although the present invention has been described in detail, it is clearly understood that the same is by way of illustration and example only and is not to be taken by way of limitation. The spirit and scope of the present invention should be limited only by the terms of the appended claims.

What is claimed is:

1. A vacuum contact printing apparatus, comprising:
a plate and a flexible sheet;
evacuating means for evacuating air from between said plate and said flexible sheet;
air forcing means for forcing air toward an edge of a composite which is supported between said plate and said flexible sheet, said composite including an original film and photosensitive material, said air forcing means including:
   (a) moving means for moving a squeegee toward said edge of said composite while pressing said squeegee against said flexible sheet, and
   (b) controlling means for controlling said moving means according to the position of said squeegee with respect to the position of said edge of said composite; and
means for printing an image of said original film on said photosensitive material by supplying light through said plate.

2. A method of operating a vacuum contact printing apparatus, comprising the steps of:
supporting a composite between a plate and a flexible sheet, said composite including an original film and photosensitive material;
evacuating air from between said plate and said flexible sheet;

forcing air toward an edge of said composite by moving a squeegee toward said edge of said composite while pressing said squeegee against said flexible sheet and by controlling the movement of said squeegee according to the position of said squeegee with respect to the position of said edge of said composite; and printing an image of said original film on said photosensitive material by supplying light through said plate.

3. The method of claim 2, wherein the step of controlling the movement of said squeegee comprises reducing the speed of said squeegee from a first speed to a second speed when said squeegee is within a predetermined distance from said edge.

4. The method of claim 3, wherein said first speed is greater than 200 mm/sec.

5. The method of claim 4, wherein said second speed is 15 mm/sec. or less.

6. The method of claim 5, wherein said second speed is zero.

7. The method of claim 6, wherein the step of controlling the movement of said squeegee further comprises increasing the speed of said squeegee from said second speed to a third speed, said third speed being greater than 200 mm/sec.

8. A vacuum contact printing apparatus, comprising:
first means having a transparent plate and a flexible sheet which define an airtight space when overlapped, for holding an original film and photosensitive material between said transparent plate and said flexible sheet,
evacuating means for removing air from said airtight space,
squeegee means for forcibly moving air in said airtight space, said squeegee means including:
  (a) pressing means for pressing against said flexible sheet, and
  (b) moving means for moving said pressing means in a first direction,
speed changing means for changing the speed of said squeegee means according to the resistance to movement of air in said airtight space, and
a light source for supplying light through said transparent plate to expose an image of said original film on said photosensitive material.

9. A vacuum contact printing apparatus in accordance with claim 8, wherein said airtight space communicates with said evacuating means through an air outlet formed in said first means, said first direction being toward said air outlet.

10. A vacuum contact printing apparatus in accordance with claim 9, wherein said pressing means includes
  (a) a squeegee, and
  (b) forcing means for forcing said squeegee toward said flexible sheet, said forcing means being fixed to said moving means.

11. A vacuum contact printing apparatus in accordance with claim 10, wherein gradations are formed on said flexible sheet, said speed changing means including:
  (a) means for inputting a read value which is representative of the position of an edge of said original film and said photosensitive material and for generating a boundary position indicating signal which corresponds to said read value,
  (b) means for detecting the position of said squeegee and for outputting a squeegee position signal which is representative of said position of said squeegee, and
  (c) means for receiving said boundary position indicating signal and said squeegee position signal and for generating a first signal when said squeegee is within a predetermined distance from said edge, said moving means being adapted to reduce the speed of said pressing means from a first speed to a second speed in response to said first signal.

12. A vacuum contact printing apparatus in accordance with claim 10, wherein said speed changing means includes:
  (a) second means for outputting a boundary position indicating signal which is representative of the position of an edge of said original film and said photosensitive material,
  (b) means for detecting the position of said squeegee and for outputting a squeegee position signal which is representative of said position of said squeegee, and
  (c) means for receiving said boundary position indicating signal and said squeegee position signal and for generating a first signal when said squeegee is within a predetermined distance from said edge, said moving means being adapted to reduce the speed of said pressing means from a first speed to a second speed in response to said first signal.

13. A vacuum contact printing apparatus in accordance with claim 12, wherein said speed changing means includes means for generating a second signal after the generation of said first signal, said moving means being adapted to increase the speed of said pressing means from said second speed to a third speed in response to said second signal.

14. A vacuum contact printing apparatus in accordance with claim 13, wherein said second speed is zero.

15. A vacuum contact printing apparatus in accordance with claim 12, wherein said second means includes detecting means for optically detecting said edge, said detecting means being movable in said first direction, said detecting means using light which does not affect said photosensitive material.

16. A vacuum contact printing apparatus in accordance with claim 10, wherein said first means includes:
  (a) a table having a rectangular opening therein, said flexible sheet being stretched on said table so as to cover said opening,
  (b) an upper frame which is pivotably attached to said table, said upper frame being adapted to cover said table, said upper frame having a central opening, said transparent plate being fixed to a lower side of said central opening, and
  (c) an airtight seal which is arranged so as to surround said opening of said upper frame, said seal defining said airtight space with said transparent plate and said table.

17. A vacuum contact printing apparatus in accordance with claim 16, further comprising support means for supporting said flexible sheet in the vicinity of said original film and said photosensitive material.

18. A vacuum contact printing apparatus in accordance with claim 17, wherein said support means includes:
  (a) a support plate for contacting the lower surface of said flexible sheet,
  (b) a mechanism for supporting said support plate in a stable position when said support plate contacts said lower surface of said flexible sheet, and
  (c) means for driving said mechanism to raise and lower said support plate.

* * * * *